United States Patent [19]

Evans

[11] 4,098,292
[45] Jul. 4, 1978

[54] LOCKING MEANS FOR SELF-SEALING QUICK DISCONNECT COUPLINGS

[75] Inventor: Bryce B. Evans, Jackson, Mich.

[73] Assignee: Aeroquip Corporation, Jackson, Mich.

[21] Appl. No.: 761,852

[22] Filed: Jan. 24, 1977

[51] Int. Cl.² .............................................. F16L 37/28
[52] U.S. Cl. ............................. 137/614.04; 251/149.6
[58] Field of Search ...................... 137/614.03, 614.04, 137/614.06; 251/149.1, 149.6

[56] References Cited

U.S. PATENT DOCUMENTS 3,791,411  2/1974  Bogeskov et al. ............ 251/149.6 X Primary Examiner—Gerald A. Michalsky
Attorney, Agent, or Firm—Collins, Oberlin & Darr

[57] ABSTRACT

A self-sealing quick disconnect coupling for detachably connecting a pair of fluid conveying conduits to each other while either or both conduits are subject to high internal fluid pressure. The coupling includes a pair of body members each containing a normally closed valve wherein one of the body members is provided with a valve operating mechanism which permits the valve of each member to remain in its closed position during interconnection of the members. After interconnection of the body members, the valve operating mechanism then permits and assists the valve of each body member to move to its open position whereat the valves of both members are interlocked to one of the body members to prevent closing of either or both valves during fluid flow through the coupling in its connected state, particularly when surges of high fluid pressure occur.

17 Claims, 6 Drawing Figures

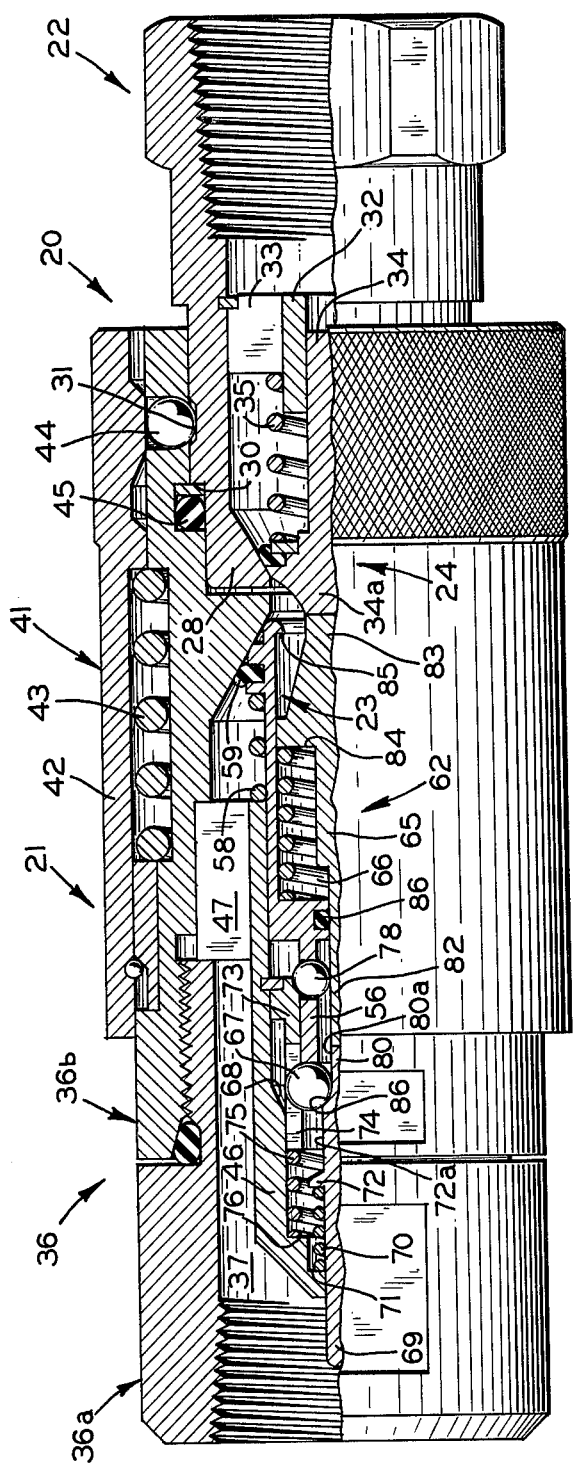
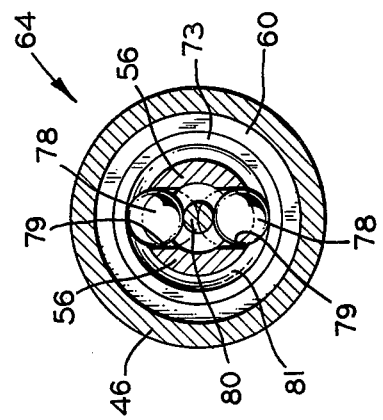
FIG. 4
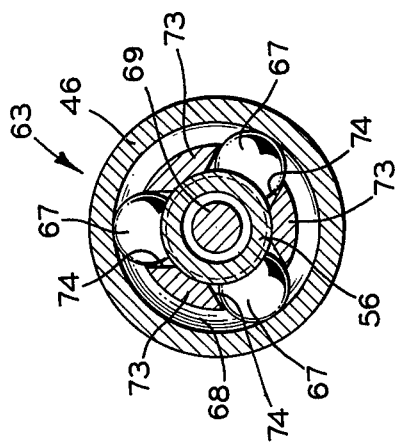
FIG. 3
FIG. 2

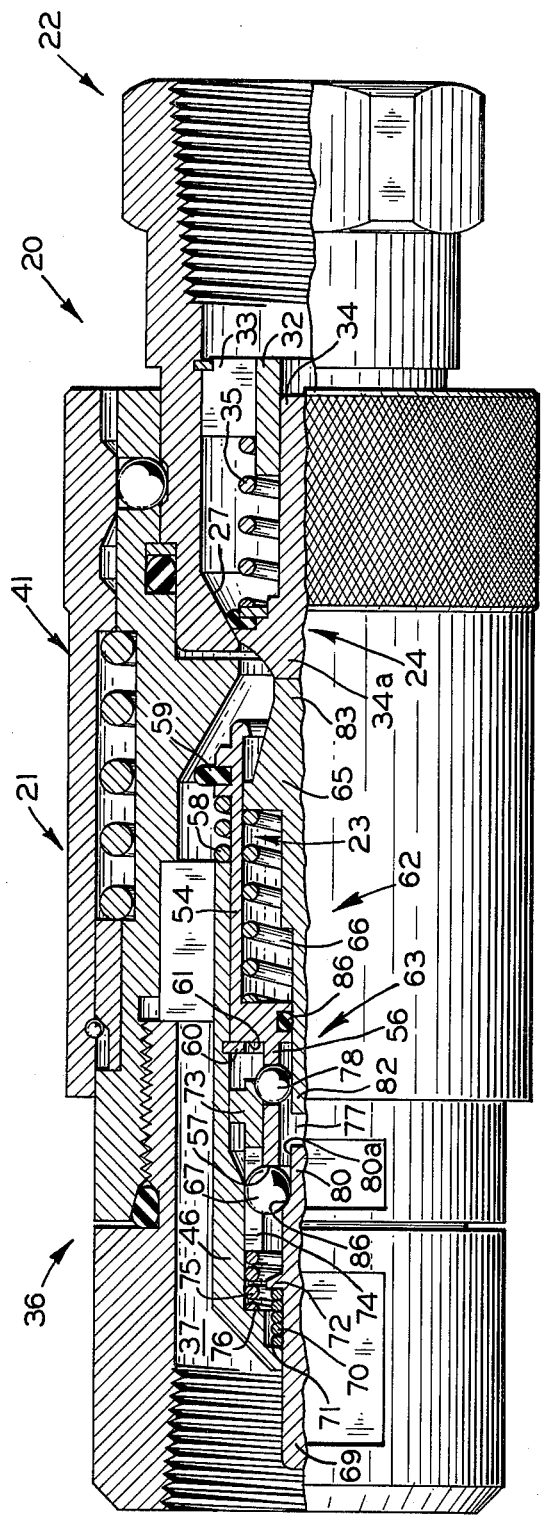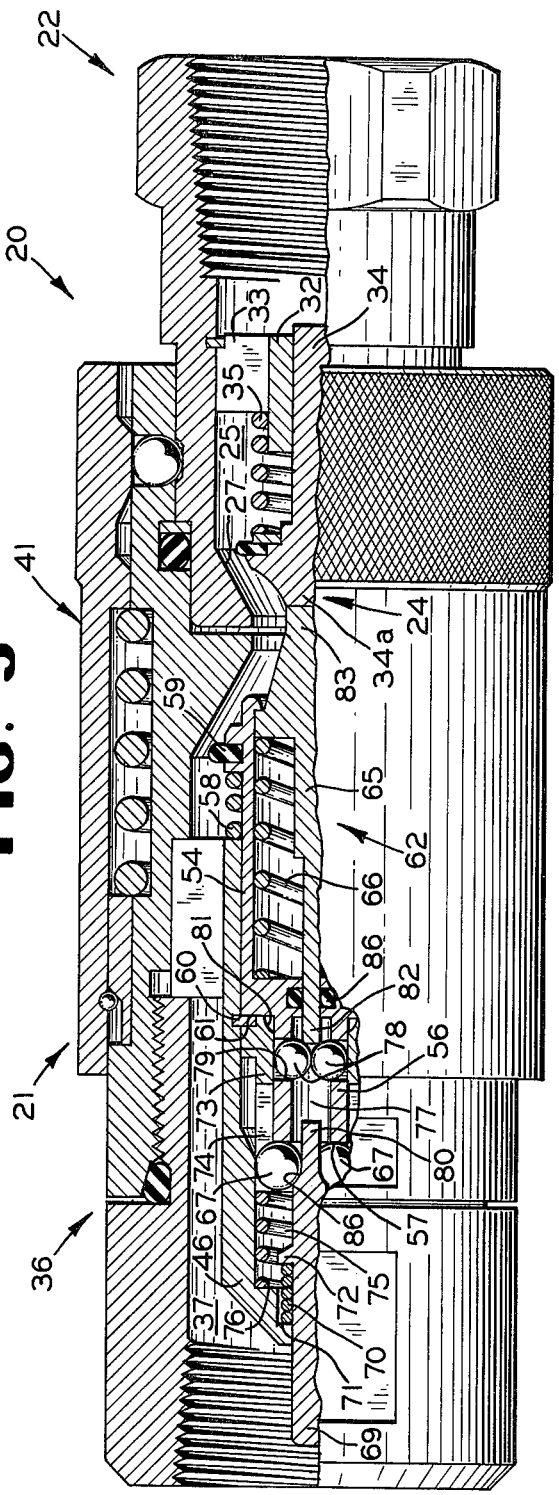

LOCKING MEANS FOR SELF-SEALING QUICK DISCONNECT COUPLINGS

BACKGROUND OF THE INVENTION

1. Field of the Invention

This invention generally relates to quick disconnect valve couplings and more particularly to locking means for isolating spring forces of spring loaded anti-checking valve couplings connectable under high fluid pressure and spring forces.

2. Description of the Prior Art

Generally, valved quick disconnect couplings used for interconnecting fluid conveying conduits are of the spring loaded type; that is, each of the two members of the coupling includes a spring for urging a valve therein to a closed or seated position when it is disconnected. Conventionally, couplings that connect under pressure include spring means for biasing and holding the valves in their open or unseated position when they are interconnected or coupled together. The couplings must be capable of transmitting fluid under high pressure such as would be encountered on modern-day tractors and related fluid pressure operated implements. Inasmuch as the fluid flowing through these couplings is at a relatively high pressure, it is apparent that the spring or springs employed for urging the valves to an open position and holding them thereat must have a very high compressive strength, particularly when surges of high fluid pressure occur from the implement side of the coupling. At such times, the surge of fluid pressure acting on the valves may equal or exceed the strength of the springs and either one or both valves of the coupling may inadvertently close. The inadvertent closure of the valves during use may cause considerable damage to the fluid operating system of a tractor and/or implement or become inoperative until the pressure in the system is relieved which, of course, may result in expensive repairs, and loss of production time.

To connect a coupling of this type, an operator is required to manually push one coupling member into the other and overcome the strength of the spring or springs which urge the valves into their seated position, as well as compress the springs which hold the valves in their open or unseated position. Thus, when springs of sufficient strength are employed to hold the valves in their open position against surges of high fluid pressure, it may be difficult, if not impossible, to manually compress the springs and effect connection of the coupling members.

From the foregoing discussion, it is apparent that the greater the compressive strength or urging effect of the spring in holding the valves in an open position, the more effective the coupling is for conveying fluid under high flow. However, the magnitude of the urging action of the spring must be based on the minimum force with which it is desired to have the valves held in their open position while taking into consideration the effort that must be expended by an operator in connecting the members of the coupling together.

Attempts have been made in the past to reduce the required strength of such springs by providing some type of inhibiting device between the reaction member and the spring means which holds both valves in their open position. An example of one such device is shown in U.S. Pat. No. 3,477,468, issued on Nov. 11, 1969. In the patent disclosure, a spring biased detent ball is disposed between a stationary member and a spring urged reaction member which moves and holds the valves of the coupling in their open positions. This, of course, permits use of lighter weight springs than those normally found in such couplings. However, an undesirable feature of this type of coupling is that the force required to shear the detent ball from the stationary member is not of great magnitude, and thus the strength of the springs holding the valves in an open position cannot be greatly reduced.

SUMMARY OF THE INVENTION

Generally speaking, the coupling constructed in accordance with this invention overcomes the aforementioned disadvantages by providing the coupling with a mechanism that effectively eliminates the action of the spring forces from the mechanism holding the valves in their open or unseated position. Thus, the strength of such springs can be greatly reduced in magnitude since spring forces are not required to hold the valves in their open position. More specifically, the coupling comprises a pair of body members, each having a bore extending therethrough and a spring normally urging a valve in each of the bores to a seated position. One of the body members is provided with a spring actuated valve operating mechanism which first permits the body members to be connected together without overcoming the spring and/or fluid pressure forces holding both valves in their seated position and then moves or assists in moving both valves to their unseated position whereat the valves are locked to one of the body members.

More particularly, the one valve is locked in its seated position to its respective body member when the body members are disconnected so that a release plunger can move relative thereto to load a spring which moves the seated valve to its unseated position once the valve is unlocked. As the body members are interconnected, the release plunger is engaged by the valve of the other body member, causing components of the operating mechanism to move to a position whereat the seated locked valve is released, permitting the loaded spring to first move the unlocked valve to an open position and then the valve in the other body member to an open position. When the spring of the operating mechanism has moved or assisted in movement of both of the valves to their unseated positions, the release plunger of the valve operating mechanism is interlocked to its associated valve for eliminating the action of the spring whereby the spring is not employed to hold either valve in its open position. Thus, this construction permits springs of relatively light weight to be employed in the coupling.

OBJECTS AND ADVANTAGES

An object of this invention is to provide a fluid coupling which prevents valves associated therewith from being reseated once they are unseated in the coupled position.

A further object of this invention is to provide a fluid coupling which interlocks one of the valves of a pair of valves associated therewith to a relatively stationary member in both its seated and unseated positions whereby the strength of the actuating springs for moving the pair of valves to their unseated positions can be greatly reduced in magnitude.

Another object of this invention is to provide a fluid coupling which permits interconnection of its members when one or both valves are subjected to high fluid pressure.

Other objects and advantages will become more apparent during the course of the following description when taken in connection with the accompanying drawings.

BRIEF DESCRIPTION OF THE DRAWINGS

In the drawings wherein like numbers are employed to designate like parts throughout the same:

FIG. 2 is an elevational view, partly in section, after the body members have been interconnected;

FIG. 3 is a cross sectional view taken substantially along the line 3—3 of FIG. 1 illustrating the first locking means;

FIG. 4 is a cross sectional view taken substantially along line 4—4 of FIG. 1 illustrating the second locking means;

FIG. 5 is an elevational view, partly in section, after the body members have been connected and fluid pressure on one body member has been relieved; and, FIG. 6 is an elevational view partly in section after the body members have been connected, the fluid pressure on the one body member has been relieved and then subsequently reapplied to the one body member.

DESCRIPTION OF THE PREFERRED EMBODIMENT

Figure 1:
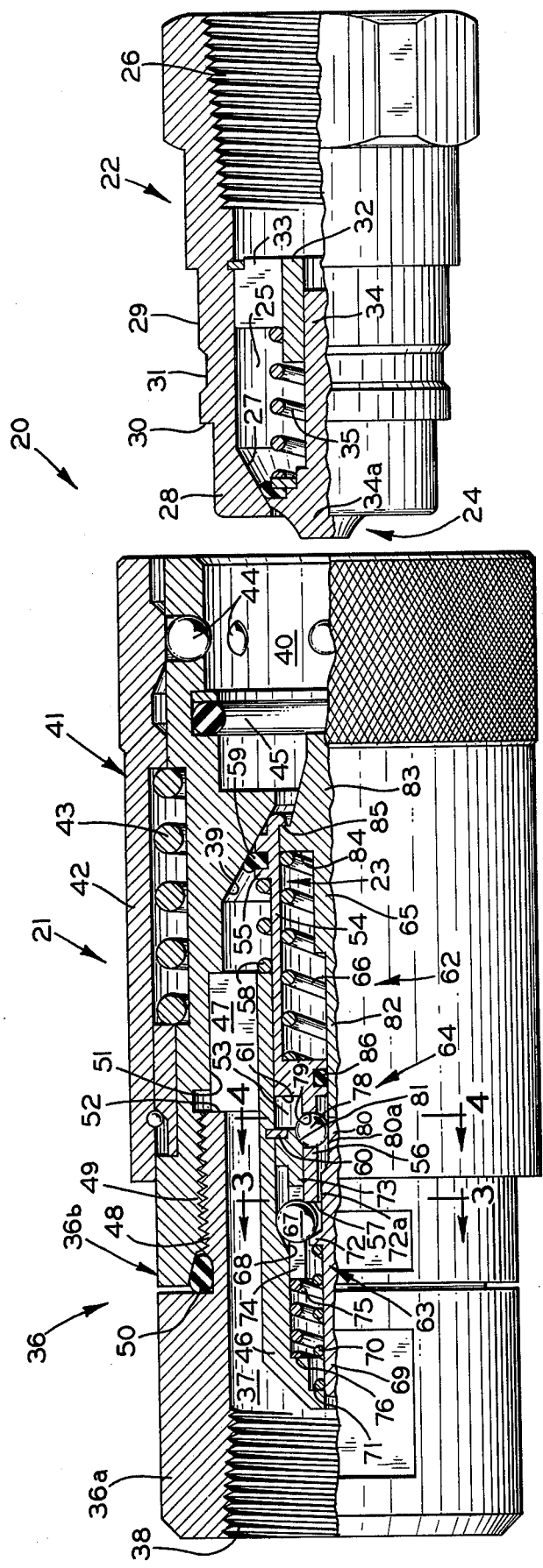
FIG. 1 is an elevational view, partly in section, of the coupling prior to the connection of the body members.

Referring first to FIG. 1, a self-sealing quick disconnect coupling, constructed in accordance with the invention and designated in its entirety by the reference numeral 20, is shown with the two coupling members disconnected. More particularly, the coupling 20 generally comprises a first tubular or female body member 21 which is connected to the pump side of a fluid system and a second tubular or male body member 22 which is connectable to the implement side of the fluid system. The body members include valves 23 and 24, respectively, which are seated when the members are disconnected, and each member is adapted to be readily secured to a hose fitting (not shown) or other component of the fluid system.

The implement side or male body member 22 is of conventional design and includes an internal bore 25 extending axially therethrough. One end of the bore 25 has an internally threaded portion 26 which receives an aforementioned hose fitting. The opposite end of the bore 25 is open and is provided with a conically shaped valve seat 27. The exterior of the body member 22 adjacent the valve seat 27 is provided with a protruding cylindrical portion 28 and a larger cylindrical portion 29 which forms a shoulder 30 between the cylindrical portions. The shoulder functions as an abutment during connection of the body members. The cylindrical portion 29 is provided with an annular recess 31 having tapered sidewalls for a purpose which will be described hereinafter.

A stationary sleeve member 32 concentrically supported and secured within the bore 25 by a three-legged spider portion 33 supports the valve 24 for axial movement within the bore 25. More specifically, the valve 24 includes an axially extending stem 34 which is slidably received within the sleeve member 32 and has an enlarged nose portion 34a. A compression spring 35 encircling the stem 34 and the sleeve 32 acts between the nose portion 34a and the spider portion 33 to yieldably urge the valve 24 into seating engagement with the valve seat 27. Also, the nose portion 34a extends beyond the protruding cylindrical portion 28 for a purpose which will be described in detail hereinafter.

The pump side or female body member 21 includes an elongated hollow cylindrical casing 36 and has an internal bore 37 extending axially therethrough. One end of the bore 37 is provided with internal threads 38 which receives an aforementioned hose fitting. The opposite end of the bore 37 is opened and is provided with a conically shaped valve seat 39. The casing 36 extends substantially beyond the valve seat 39 and is provided with an enlarged counterbored portion 40 which opens into the bore 37. The counterbored portion 40 is adapted to receive the protruding cylindrical portion 28 of the male body member 22. The extended end of the casing 36 is provided with a conventionally designed releasable connector 41.

Referring now to FIGS. 1 and 2, the female body member 22 is detachably connected to the male body member 21 by simply moving a locking collar 42, provided on the casing 36, either to the left or right as viewed in FIG. 1, against the urging force of a spring 43. Movement in either direction allows the exterior shoulder 30 on the member 22 to move past retaining balls 44 provided in the extended end of the casing 36 so that the shoulder 30 is to the left or inwardly of the retaining balls 44 as viewed in FIG. 2. The locking collar 42 is then released and the spring 43 moves the collar 42 to a central position as viewed in FIG. 2, thereby camming the retaining balls 44 into the annular recess 31 to interconnect the male body member 22 to the female body member 21. A conventional O-ring seal 45 provided in the counterbored opening 40 of the casing 36 coacts with the exterior surface of the protruding portion 28 to effectively seal the interconnection between the female and the male body members 21 and 22, respectively.

Referring now to FIG. 1, the female body member 21 further includes an elongated stationary sleeve member 46 concentrically supported and secured within the bore 37 by a three-legged spider portion 47, for supporting the valve 23 for axial movement in the bore 37. In order to secure the sleeve member 46 within the bore 37, the casing 36 is constructed as a two-section member 36a and 36b. One end of the section 36a includes the internally threaded portion 38 and its opposite end is provided with an externally threaded portion 48. The adjoining end of the section 36b is attached to the threaded portion 48 of the section 36a by an internally threaded portion 49. A sealing ring 50 is interposed at the base of the threads 48 to prevent fluid leakage between the threads. The bore 37 in the section 36b is provided with a counterbored portion 51 adjacent the threaded portion 49, and with the end of the threaded portion 48 defines an internal annular recess 52 which receives and securely holds portions of the three-legged support spider 47. More specifically, the spider portion 47 of the sleeve member 46 is inserted into the counterbore portion 51, the casing section 36b is threaded onto the casing section 36a securing the spider portion in the recess 52, and, thus, the sleeve 46 is firmly attached and stationary with respect to the casing 36. The exterior surface of the sleeve member 46 is spaced from the wall of the bore 37 to permit fluid flow through the bore 37.

As previously indicated, valve 23 is supported for axial movement within the stationary sleeve 46. More particularly, the sleeve 46 is provided with an axially extending bore 53 having an open end. The valve 23 includes an elongated hollow cylindrical body 54 having a radially projecting flange 55 at one end thereof and a reduced diameter annular portion 56 having a free end 57 extending axially from its opposite end. The valve body 54 is slidably received in the bore 53 of the sleeve member 46. A spring 58 encircling the cylindrical body 54, is compressed between the end wall of the sleeve member 46 and a surface of the radially projecting flange 55 on the valve 23 and yieldably urges the valve 23 into seating engagement with the valve seat 39. The periphery of the flange 55 is provided with an annular groove which receives an O-ring seal 59 which sealingly engages the valve seat 39 to prevent fluid leakage past the valve 23 when it is in its seated or closed position. The intermediate portion of the bore 53 of the sleeve member 46 is provided with a snap ring 60 against which the end 61 of the valve body 54 abuts when the valve 23 is moved to the left, as viewed in FIG. 5, to its open or unseated position.

A novel valve actuating mechanism, designated in its entirety by the reference numeral 62, is provided in the female body member 21 for preventing premature opening of the valve 23 during interconnection of the body members 21 and 22 and for eliminating the action of any spring employed to move the valves 23 and 24 to their unseated position from holding them in their unseated positions. Also, the manual effort required to initially interconnect the body members 21 and 22 will be reduced by the mechanism 62 in a manner to be described hereinafter. Generally speaking, the valve actuating mechanism 62 includes a first locking means 63 for interlocking the valve 23 to the stationary sleeve 46 so that the valve 23 cannot move from its unseated position until after the body members 21 and 22 are connected together and a second locking means 64 which is actuated after the first locking means 63 is released for interlocking the valve 23 to a release plunger 65 so that an actuating spring 66 provided for first moving the valve 23 to its unseated position and then the plunger 65 to a position to hold the valve 24 in its unseated position is not required to hold either valve in its unseated position.

Referring now to FIGS. 1 and 3, the first locking means 63 for interlocking the valve 23 in its seated position when the body member 21 is in its disconnected state includes a plurality of locking balls 67 which engage the free end 57 of the valve's annular portion 56, and a detent seat 68 provided on the interior surface of the sleeve 46. The locking balls 67 are cammed into engagement therewith by an elongated axially movable cam member 69 which is yieldably urged to the right as viewed in FIG. 1 by a spring 70 compressed between a reaction shoulder 71 provided on the sleeve 46 and a tapered camming shoulder 72 provided on the cam member 69. The cam member 69 is provided with an elongated cylindrical surface 72a adjacent the camming shoulder 72 for holding the locking balls 67 in engagement with the seat 68 so that the release plunger 65 moves relative to the valve 23 until the body members 21 and 22 are connected together. The valve 23 will remain in its locked seated position until the locking balls 67 are released from the detent seat 68 in the stationary member 46. The locking balls 67 are held in circumferentially spaced relationship by an axially movable retainer sleeve 73 having three axially extending grooves 74 which permit the balls to move axially relative thereto. One end of the retainer sleeve 73 is yieldably urged to the right as viewed in FIG. 1 against the snap ring 60 by a spring 75, compressed between a reaction shoulder 76 and the opposite end of the retainer sleeve 73 for a purpose to be described hereinafter.

As herein before pointed out, the primary purpose of this invention is to eliminate the necessity for any spring action in holding the valves 23 and 24 in their unseated position. Thus, as previously indicated, the valve 23 of the female body member 21 is interlocked in its unseated position to the plunger 65 to eliminate the action of the spring 66 from the actuating mechanism 62 once it has moved or assisted the valves to move to their unseated position. As best illustrated in FIGS. 5 and 6, the plunger 65 is adapted to move away from the cam member 69 to provide a gap or detent opening 77 therebetween for receiving locking balls 78 which engage the valve body 54 with the plunger 65. This feature of the invention will be described in detail in the description of the operation of the mechanism 62.

Referring now to FIGS. 1 and 4, the second locking means 64 includes at least two locking balls 78 which reside in a pair of diametrically opposed openings 79 provided in the valve's annular portion 56 for movement with the valve 23. As viewed in FIG. 1, with the female member disconnected, the balls 78 rest on the surface 80a of an elongated reduced diameter stem portion 80 of the cam member 69 and are urged thereagainst by an annular ball seat 81 provided on the end of the retainer sleeve 73. Thus in the disconnected state of the female body member 21, the locking balls 78 are trapped between the surface 80a of the cam 69 and the retainer sleeve 73.

Still referring to FIG. 1, the elongated release plunger 65 is centrally disposed and slidably received within the interior of the valve body 54. More specifically, the plunger 65 includes an elongated cylindrical stem portion 82, similar in size to the stem portion 80 of the cam member 69, which extends through a seal 86 provided in the valve body 54 for preventing leakage of fluid from the body member 21 when it is in its disconnected state. Also, the end of the plunger stem portion 82 engages the end of the cam stem portion 80 when the body member 21 is in its disconnected state. The plunger 65 further includes an enlarged nose portion 83 which extends substantially beyond the valve 23 and is engagable with the nose portion 34a of the valve 24 when the male and female body members 22 and 21 respectively are connected together. The spring 66, surrounding the plunger 65 and compressed between the valve body 54 and a shoulder 84 formed on the plunger's nose 83, yieldably urges the plunger 65 against a lid 85 rolled over from the open end wall of the valve's body portion 54. Accordingly, axial movement of the release plunger 65, to the left as viewed in FIG. 1, also moves the cam member 69 in that direction relative to the valve 23.

Accordingly, it is readily apparent that the first locking means 63 interlocks the valve 23 to the stationary sleeve 46 and its valve body 54 cannot move until the shaft 82 of the plunger 65 has moved from under the primary locking balls 78 thus preventing premature locking of the primary or second locking means 64 during connection of the body members 21 and 22, particularly when there is no fluid pressure acting on the valve 23 of the female body member 21.

OPERATION

As illustrated in FIG. 1, the relationship between the components of the male and female body members 22 and 21, respectively, is shown prior to their connection. As viewed therein, the compressive force of the valve spring 58 and fluid pressure, if any, in the bore 37 urges the valve 23 into engagement with its valve seat 39. The locking balls 67 of the first locking means 63 are held in engagement with the seat 68 on the stationary sleeve member 46 by the surface 72a of the cam member 69 which is urged to the right as viewed in FIG. 1 by the cam spring 70. At the same time, the actuating spring 66 urges the release plunger 65 to the right as viewed in FIG. 1 into engagement with the lip 85 provided on the valve body 54 as its end 57 is trapped by the locking balls 67. Thus, in the disconnected state of the coupling the female valve 23 is locked in its seated position to the stationary sleeve 46. Also, it is to be noted that the spring 58 urging the valve 23 towards its seated position need only have enough force to sealingly engage the valve 23 with its seat 39.

Referring now to FIG. 2, the relationship of the components of the valve actuating mechanism 62 with respect to the valves 23 and 24 is illustrated after the body members 21 and 22 have been connected together. As illustrated therein, both valves 23 and 24 remain in their seated position when the body members 21 and 22 are initially interconnected, and only the components of the valve actuating mechanism 62 move relative to each other. Thus, as the male body member 22 is inserted into the female body member 21, the nose portion 34a of the valve 24 engages the nose portion 83 of the plunger 65, thus moving the plunger 65 to the left as viewed in FIG. 2 and compressing the actuating spring 66. Simultaneously, since the plunger 65 engages the cam member 69, it also moves the cam member to a position whereat the locking balls 67 are released from the stationary member 46 and the spring 70 is partially compressed. After the locking balls 67 have been released from the stationary sleeve 46, the valve 23 is free to move to its unseated position. Thus, if no fluid pressure is acting on the valve 23, the actuating spring 66 will move the valve 23 to its open position. However, since, as designed, the compressive strength of the actuating spring 66 is less than the combined strength of the valve spring 58 and the fluid pressure acting on the valve 23, the valve 23 will remain in its seated position until the fluid pressure is relieved. Also, it will be noted that the valve 24 of the male body member 22 remains seated as the combined strength of the spring 35 and the fluid pressure acting on the valve 24 is designed to be greater than the strength of the actuating spring 66. Thus, in effecting the initial interconnection of the body members 21 and 22, it will not be necessary to unseat valve 23 which may be under high fluid pressure, but will only be necessary to compress springs 66, 70, and move against a very small force created by the fluid pressure and the cross sectional area of the cam member 69 causing the components of the actuating mechanisms 62 to move to the position shown in FIG. 2. At this point, when the valves are subjected to fluid pressure they remain in seating engagement with their respective valve seats with the locking balls 67 released from the stationary member 46. Thus, it is apparent that only springs of small compressive strength need be employed in the coupling 20 and initial connection of the body members 21 and 22 together is easily accomplished.

The next step in interconnecting the body members 21 and 22 is to relieve the fluid pressure acting within the female body member 21 to unseat the valve 23. Referring now to FIG. 5, the components of the valve actuating mechanism 62 are shown at the time the pressure is relieved in the female body member 21, or the position of valve actuating mechanism 62 having gone through the sequence of FIG. 2 when connecting with no pressure on the female or pump side. When the fluid pressure is relieved, the compressed actuating spring 66, whose compressive strength is designed to be greater than the compressive strength of the valve spring 58, causes the valve 23 to move to the left as viewed in this figure, until the end wall 61 of the valve body 54 abuts the snap ring 60 whereat the valve 23 is in its unseated position. Simultaneously, the free end 57 of the valve 23 engaging the locking balls 67 bearing against a seat 86 on the cam member 69 further moves the cam member 69 to fully compress the spring 70. At this point, the gap 77 first appears between the adjacent ends of plunger 65 and the cam member 69. Also, it is to be noted at this time that the locking balls 67 are held in the seat 86 on the cam member 69 by engaging the interior surface of the stationary sleeve 46, thus holding and separating the cam member 69 from the plunger 65 to create the gap or detent 77 for receiving the interlocking balls 78. Also, during this stage of events, the second locking means 63 is being set-up to interlock the valve 23 to the plunger 65 for rendering the actuating spring 66 ineffective in holding the valve 23 in its unseated position. More specifically, the interlocking balls 78, carried by the valve 23 have moved the retainer sleeve 73 to a position which compresses spring 75 so that spring 75 can move the retainer sleeve 73 to a position whereat it holds the balls 78 in the gap 77 once the balls 78 have been released from the plunger stem 82. As is apparent, the compressive strength of the actuating spring 66 need only be large enough to compress the springs 58, 70, 75 and overcome the friction of seal 86.

The last step in the interconnection of the body members 21 and 22 is to reapply the fluid pressure to the female body member 21. As illustrated in FIG. 6, the relationship between the components of the valve actuating mechanism 62 and the body members 21 and 22 is illustrated after fluid pressure has been reapplied to the female body member. Fluid under pressure flows through the female body member 21, against the valve 24 of the male body member 22, thereby causing the valve 24 to move from its seat 27 inasmuch as the fluid pressure and the compressive strength of the partially compressed actuating spring 66 are designed to be greater than the compressive strength of the valve spring 35 and any fluid pressure that may be acting on the valve 24 from a related implement. With the expansion of the actuating spring 66 and subsequent movement of the plunger 65 to the right as viewed in FIG. 6, its stem 82 will move from beneath the interlocking balls 78 freeing them for movement into the gap 77. Expansion of the spring 75 bearing against the retainer sleeve 73 moves the retainer sleeve to a position causing the balls 78 to move together into the gap 77 and against the end of the plunger 65 thereby interconnecting the plunger 65 and the valve 23. More specifically, the balls 78 are urged into the gap 77 by the sleeve 73, and as its interior surface moves past the balls 78 it locks the balls within the gap 77. Thus, when the components of the actuating mechanism 62 are in the relationship illustrated in FIG. 6, the actuating spring 66 no longer exerts force on the valve 23 or plunger 65 since they are interlocked to each other. Accordingly, if a reverse surge of high pressure should occur in the fluid, such as when an implement is being operated and the components of the body members 21 and 22 are in a position shown in FIG. 6, the seating of the valve 24 is prevented inasmuch as there is a positive connection between the valve 24 and the valve 23 which is seated on the snap ring 60 provided in the stationary member 46.

From the foregoing discussion, it can readily be seen that the interconnection of the male and female body members 22 and 21, respectively, under pressure, is quickly and easily effected inasmuch as it is not necessary to unseat one or both of the valves 23 and 24 during the initial connection step. Rather, it is only necessary to exert an inward force on the plunger 65 to cause compression of the spring 66 and partial compression of the spring 70 as well as a small pressure force on the free end of the cam member 69, to permit the male body member 22 to be inserted into and interconnected to the female body member 21. The actual unseating of the valves 23 and 24 is caused by the utilization of the actuating spring 66 together with the fluid pressure in the systems. Also, it is apparent that the valve actuating mechanism 62 functions to interlock the valve 23 and the plunger 65 to eliminate the action of the spring 66 once the valves have been moved to their unseated positions. Thus, the valve 23 seating against the snap ring 60 in its open position prevents seating of valve 24 as it bears against the valve 23 should a reverse surge of high fluid pressure occur through the body members.

Further, it can be seen that the compressive resistance of the individual springs, particularly the actuating spring 66, can be greatly reduced as they are combined in various combinations to permit and assist opening and closing of the valves 23 and 24. In other words, by way of example, if a single spring was employed to urge the valve of each body member to its closed position, the springs would, under normal conditions of use, have a magnitude of 40 to 70 pounds of force, thus making it almost impossible to manually interconnect the body members of the coupling. However, with the spring and locking arrangement of the novel valve actuating mechanism 62, the springs need only have a magnitude of 10 to 15 pounds of force making it much easier to effect the initial coupling step, and yet, the spring forces are large enough to assist in moving the valves to their unseated position whereat they are effectively eliminated from holding the valves in their unseated positions.

It is to be understood that the form of the invention herewith shown and described is to be taken as an illustrative embodiment only of the same and that various changes in the shape, size and arrangement of the parts may be resorted to without departing from the spirit of the invention.

I claim:

1. In a self-sealing quick disconnect coupling of the type to be coupled and uncoupled while subject to high internal pressures and including a pair of interconnectable body members each having a bore extending therethrough, a normally seated valve within each said bore, said valves having members engagable with each other when said bodies are coupled together, and connecting means for initially interconnecting said body members without unseating either of said valves, the improvement comprising:
    a. means for interlocking one of said valves to its said body member when it is in its seated position;
    b. means for releasing said interlocking means when said bodies are coupled together for permitting one valve to move from its seated position;
    c. means connected to said releasing means for moving said one valve to an unseated position;
    d. means for moving the other said valve to an unseated position; and,
    e. means for mechanically interlocking said one valve to its said body member when it is in its unseated position whereby said other valve is positively held against movement towards its seated position.

2. In a self-sealing quick disconnect coupling of the type for detachably connecting conduits conveying fluid under pressure wherein a first body member having a normally closed valve is operatively connected to a source of fluid under pressure and a second body member having a normally closed valve is operatively connected to a device operated by the fluid under pressure, and having means for detachably connecting said first and said second body members together without opening said valves of either said member, the improvement comprising:
    a. a stationary member in said first body member;
    b. a first locking means for interlocking said valve to said stationary member in its closed position;
    c. a plunger movable in one direction for releasing said first locking means upon coupling of said first and said second body members;
    d. means for moving said valve in said first body member to an open position;
    e. said moving means acting to move said plunger in another direction for moving said valve and said second body member to an open position; and
    f. second locking means for interlocking said plunger to said valve of said first body member whereby said valve of said second body member is locked against movement towards its closed position.

3. A self-sealing quick disconnect coupling as claimed in claim 2, wherein
    a. said stationary member is an elongated hollow sleeve;
    b. said valve in said first member includes an elongated hollow body slidably mounted in said stationary hollow sleeve;
    c. said plunger is slidably mounted in said hollow valve body; and
    d. said moving means comprises a spring compressed between said hollow valve body and said plunger for urging said valve in said first body to its open position.

4. A self-sealing quick disconnect coupling as claimed in claim 3, wherein said stationary member includes an abutment for limiting the movement of said valve member in the one direction.

5. A self-sealing quick disconnect coupling as claimed in claim 2, wherein said stationary member includes a seat and said first locking means comprises a plurality of locking balls releasably engagable with said stationary seat, a retainer sleeve for orienting said balls relative to an end of said valve member and cam means for urging said balls into engagement with said stationary seat and said end of said valve member.

6. A self-sealing quick disconnect coupling as claimed in claim 5, wherein said cam means includes an axially movable cam member and a spring for moving said cam member in a direction for urging said balls into said stationary seat.

7. A self-sealing quick disconnect coupling as claimed in claim 6, wherein said cam member includes means for releasing said balls from said stationary seat and said plunger moves said cam member in the direction to release said balls.

8. In a self-sealing quick disconnect coupling of the type for detachably connecting conduits conveying fluid under pressure wherein a first body member having a normally closed valve is operatively connected to a source of fluid under pressure and a second body member having a normally closed valve is operatively connected to a device operated by the fluid under pressure, and a connecting means for detachably connecting said first and said second body members together without opening said valves of either said member, the improvement comprising:
 a. an elongated stationary sleeve having an open end in said first body member;
 b. an elongated hollow body extending from said valve and slidably mounted in the open end of said stationary sleeve and releasably locked thereto;
 c. a plunger slidably mounted in said hollow valve body;
 d. resilient means compressed between said valve body and said plunger for urging said valve to an open position; and
 e. means releasing said valve from said stationary sleeve upon a predetermined movement of said plunger in one direction whereby said resilient means moves said valve to its open position.

9. A self-sealing quick disconnect coupling as claimed in claim 8, wherein said stationary member includes a stop means and said resilient means after moving said valve in said first body member to an open position against said stop means, urges said plunger in the opposite direction to move said valve in said second body member to an open position.

10. A self-sealing quick disconnect coupling as claimed in claim 9, including locking means for interlocking said plunger to said valve in said first body member whereby said plunger holds said valve in said second body member in its open position.

11. A self-sealing quick disconnect coupling as claimed in claim 10, wherein said locking means comprises at least two locking balls carried by said valve in said first body member, an end of said plunger engages said locking balls, and said stationary member includes means for holding said locking balls in engagement with said plunger.

12. A self-sealing quick disconnect coupling as claimed in claim 11, wherein said holding means comprises a sleeve and a spring for urging said sleeve into engagement with said balls.

13. A valve operating mechanism for a self-sealing quick disconnect coupling comprising:
 a. a stationary member;
 b. a valve member including release means therefor with both being axially movable relative to said stationary member and to each other;
 c. resilient means compressed between said valve member and said release means for urging said valve member axially in one direction and said release means axially in the opposite direction;
 d. a first locking means for releasably locking said valve member to said stationary member;
 e. means for moving said release means in said one direction for releasing said first locking means and moving said valve a predetermined distance in said one direction and then moving said release means a predetermined distance in said other direction relative to said stationary member; and,
 f. a second locking means for releasably locking said release means to said valve member after said release means has moved the predetermined distance in said other direction.

14. A valve operating mechanism for a self-sealing quick disconnect coupling as claimed in claim 13, wherein said stationary member includes an abutment and said resilient means comprises a spring which urges said valve member axially in said one direction against said abutment.

15. A valve operating mechanism for a self-sealing quick disconnect coupling as claimed in claim 14, wherein said second locking means comprises at least two locking balls carried by said valve member, an axially movable sleeve member movable in said one direction by said locking balls, a spring for urging said sleeve member in said opposite direction, and said release means is a plunger whereby said spring moves said plunger a limited distance in said opposite direction, said sleeve member urges and holds said locking balls in engagement with the end of said plunger, thereby locking said plunger to said valve.

16. A valve operating mechanism for a self-sealing quick disconnect coupling as claimed in claim 13, wherein said first locking means comprises a plurality of locking balls, a cam member axially movable in said one direction by said release means, a spring for axially moving said cam member in the opposite direction to said one direction, and said stationary member includes a seat whereby said spring urges said cam member in said opposite direction to engage said locking balls in said seat.

17. A valve operating mechanism for a self-sealing quick disconnect coupling as claimed in claim 16, wherein said cam member includes a reduced portion for releasing said locking balls from said stationary member after limited movement in said one direction.

* * * * *